United States Patent
Yamamuro

(10) Patent No.: US 9,571,701 B2
(45) Date of Patent: Feb. 14, 2017

(54) INFORMATION PROCESSING APPARATUS, CONTROL METHOD FOR INFORMATION PROCESSING APPARATUS, AND IMAGE FORMING SYSTEM

(71) Applicant: Konica Minolta, Inc., Chiyoda-ku, Tokyo (JP)

(72) Inventor: Tatsuro Yamamuro, Kashiwa (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 14/938,386

(22) Filed: Nov. 11, 2015

(65) Prior Publication Data
US 2016/0134782 A1    May 12, 2016

(30) Foreign Application Priority Data
Nov. 12, 2014 (JP) .................. 2014-229858

(51) Int. Cl.
    H04N 1/60 (2006.01)
    G06K 1/00 (2006.01)
(52) U.S. Cl.
    CPC ............ H04N 1/605 (2013.01); H04N 1/6036 (2013.01)
(58) Field of Classification Search
    CPC .. H04N 1/6011; H04N 1/6041; H04N 1/6052; H04N 1/605; H04N 1/6036
    USPC .......................... 358/1.9, 518, 448; 382/162
    See application file for complete search history.

(56) References Cited

U.S. PATENT DOCUMENTS 8,228,559 B2 *  7/2012  Parmar .............. G03G 15/0131
                                                 358/1.9
2004/0184658 A1 *  9/2004  Inoue ................... H04N 1/6055
                                                 382/162

FOREIGN PATENT DOCUMENTS

JP        2005-318478 A      11/2005

* cited by examiner

Primary Examiner — Quang N Vo
(74) Attorney, Agent, or Firm — Buchanan Ingersoll & Rooney PC

(57) ABSTRACT

An information processing apparatus includes a data analysis unit analyzing an overlap region where an image printed by a first image forming apparatus and an image printed by a second image forming apparatus overlap each other, first and second color patch generation units generating first and second color patches corresponding to colors of the overlap region, an adjustment unit adjusting color information with which an image is printed on a printed matter, based on a result of measurement of a color patch measured by a measurement unit, and an instruction output unit instructing the image forming apparatus to print the image based on the adjusted color information.

15 Claims, 11 Drawing Sheets

INFORMATION PROCESSING APPARATUS, CONTROL METHOD FOR INFORMATION PROCESSING APPARATUS, AND IMAGE FORMING SYSTEM

This application is based on Japanese Patent Application No. 2014-229858 filed with the Japan Patent Office on Nov. 12, 2014, the entire content of which is hereby incorporated by reference.

BACKGROUND OF THE INVENTION

Field of the Invention

The present invention relates to an information processing apparatus, a control method for an information processing apparatus, and an image forming system.

Description of the Related Art

Image forming apparatuses such as printer, copier, multi function peripheral (MFP) having the color printing capability have become widespread. In the case where this image forming apparatus is used to perform color printing, color management is important for accurately reproducing colors included in a job. Then, conventionally a color patch placed on an edge of a printed matter is measured by an inline sensor provided in an image forming apparatus, and an information processing apparatus which controls the image forming apparatus compares color information extracted from the job with the color information read by the inline sensor to thereby determine the color variation therebetween, and performs feedback at any time so that the color variation falls within a proper range.

Regarding such feedback control, Japanese Laid-Open Patent Publication No. 2005-318478 discloses a configuration for managing colors of an image forming apparatus, by placing color patches having different types of tone patterns on a peripheral margin of a sheet of paper alternately in a predetermined order and measuring the color patches.

SUMMARY OF THE INVENTION

In the case where variable data is to be printed, there is a workflow of outputting a fixed portion through offset printing in advance and overprinting only a variable portion through digital printing.

In order to ensure the quality appropriate to the final printed matter of this workflow, it is not sufficient to merely manage colors of an image forming apparatus which performs digital printing.

For example, offset printing and digital printing differ from each other in terms of printing method and therefore in terms of color gamut, which leads to a problem of difficulty in management of colors in a superimposed portion where an image is overwritten.

The present disclosure is given to solve such a problem, and provides an information processing apparatus, a control method for an information processing apparatus, and an image forming system that are capable of properly managing colors when an image is printed on a printed matter.

In order to achieve at least one of the above-described objects, an information processing apparatus reflecting an aspect of the present disclosure controls a first image forming apparatus, and a second image forming apparatus performing printing on a printed matter printed by the first image forming apparatus and including a measurement unit measuring a printed color patch. The information processing apparatus includes: a data analysis unit analyzing an overlap region where an image printed by the first image forming apparatus and an image printed by the second image forming apparatus overlap each other; a first color patch generation unit generating a first color patch which is included in first print data printed by the first image forming apparatus and corresponds to a color of the overlap region in the image printed by the first image forming apparatus, based on a result of analysis by the data analysis unit; a second color patch generation unit generating a second color patch which is included in second print data printed by the second image forming apparatus and corresponds to a color of the overlap region in the image printed by the second image forming apparatus, based on the result of analysis by the data analysis unit, so that a color patch of a color of the overlap region is generated by a combination of the first color patch and the second color patch; an adjustment unit adjusting color information when the second image forming apparatus prints the image on the printed matter, based on a result of measurement of the color patch measured by the measurement unit; and an instruction output unit instructing the second image forming apparatus to print the image based on the color information adjusted by the adjustment unit.

Preferably, the adjustment unit makes a determination as to whether or not a color difference between the color patch on the primed matter and reference information is less than a specified value.

Preferably, the adjustment unit adjusts a parameter of the color information based on a result of the determination.

Preferably, the second color patch generation unit edits the second color patch included in the second print data, in accordance with an instruction.

Preferably, the information processing apparatus further includes a third color patch generation unit generating a third color patch which is included in the second print data printed by the second image forming apparatus and corresponds to a color of a region other than the overlap region in the image printed by the second image forming apparatus, based on the result of analysis by the data analysis unit. The adjustment unit adjusts the color information when the second image forming apparatus prints the image on the printed matter, based on a result of measurement of the third color patch measured by the measurement unit, in accordance with an instruction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
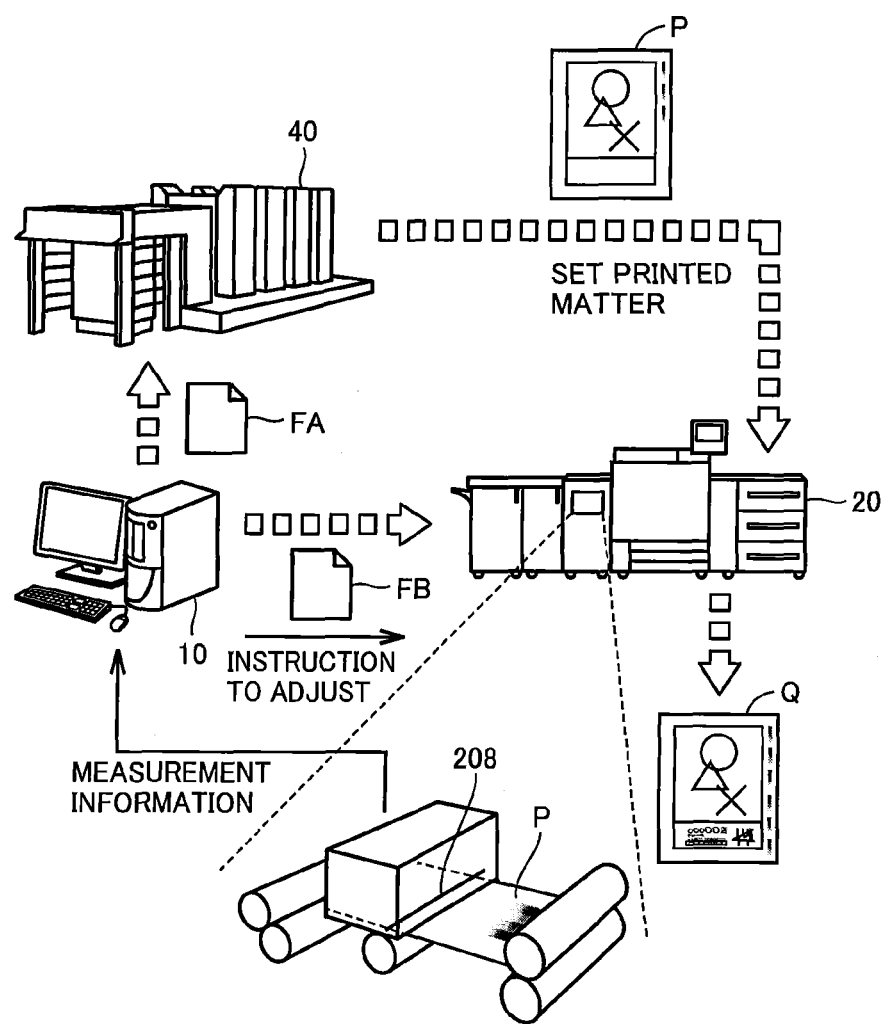
FIG. 1 is a diagram illustrating a schematic configuration of a printing system 1 based on an embodiment.

Embodiments will hereinafter be described in detail with reference to the drawings. In the drawings, the same or corresponding parts are denoted by the same reference characters, and a description thereof will not be repeated.

[Overview of Printing System]

FIG. 1 is a diagram illustrating a schematic configuration of a printing system 1 based on an embodiment.

Referring to FIG. 1, printing system 1 includes an information processing apparatus 10 and image forming apparatuses 20, 40.

Information processing apparatus 10 is provided so that it is capable of communicating with each of image forming apparatuses 20, 40, and outputs, as a job, print instructions based on print data FA, FB to image forming apparatuses 20, 40, respectively.

Image forming apparatus 40 in this example is provided as an image forming apparatus performing offset printing, by way of example. Image forming apparatus 20 is provided as an image forming apparatus performing digital printing.

Image forming apparatus 40 performs offset printing based on print data FA.

Image forming apparatus 20 performs digital printing based on print data FB, on a printed matter P generated through offset printing by image forming apparatus 40, namely performs so-called overprinting. In this example, a case is illustrated where image forming apparatus 20 outputs a final printed matter Q through digital printing.

While the quality appropriate to final printed matter Q is to be ensured, it is difficult to properly manage colors of a superimposed portion of a printed portion of printed matter P generated through offset printing and a printed portion generated through digital printing on printed matter P.

Depending on the color of the base of the printed portion of printed matter P, a color of the printed portion generated through digital printing is mixed with the color of the base and thereby changed. Accordingly, the color which is measured is not the actually printed color but a color mixture. It is therefore necessary to suppress variation of the color of the color mixture.

With regard to this offset printing causes density variations during output, and variations with time are large.

In view of the above, printing system 1 based on the embodiment adjusts colors to be printed through digital printing, so that they conform to printed matter P generated through offset printing.

In this example, printed color information is measured by an inline sensor 208 provided in image forming apparatus 20, by way of example.

Specifically, image forming apparatus 20 uses inline sensor 208 to measure a color patch printed on printed matter P by image forming apparatus 40. This color patch is a color patch (first color patch) printed on printed matter P by image forming apparatus 40 for the sake of color adjustment, and another color patch (second color patch) is printed by image forming apparatus 20 so that this color patch overlaps the first color patch.

In this example, information processing apparatus 10 analyzes the region where an image printed by image forming apparatus 40 and an image printed by image forming apparatus 20 overlap each other, and thereby generates the first and second color patches for colors of the overlap region.

The first color patch corresponds to the color of the base of the overlap region.

The second color patch corresponds to the colors printed (overprinted) on the base of the overlap region.

Information processing apparatus 10 generates the first color patch including sections corresponding to color combinations of the overlap region, and instructs image forming apparatus 40 to print the print data including the first color patch for the color of the base. Information processing apparatus 10 also generates the second color patch for color combinations of the overlap region, with respect to the first color patch for the color of the printed base, and instructs image forming apparatus 20 to print the print data including the second color patch.

Image forming apparatus 20 uses inline sensor 208 to measure a color patch for the colors of the overlap region generated by printing the second color patch on the first color patch printed by image forming apparatus 40. Image forming apparatus 20 then transmits the results of the measurement to information processing apparatus 10.

Information processing apparatus 10 analyzes the results of the measurement to thereby adjust the color information. Specifically, for each object type (Image/Graphic/Text, for example) and for each color space (CMYK/RGB/Gray, for example), the tone curve, the color profile, and the like (parameters) are set, so that a color difference between the results of the measurement made by inline sensor 208 and a reference value to be compared therewith is less than a specified value. For example, as the reference value to be compared, a reference value designed in advance may be used. Alternatively, information about measurement of first printed matter Q may be used as the reference value. Information about measurement of the color patch printed on the first printed matter Q may be used as the reference value, and this reference value may be compared with the results of measurement of the color patch on a printed matter which is made after multiple pieces of printed matter have been made, so that a difference in color value (color difference) therebetween is obtained. Information about measurement of printed matter Q tested by way of test printing or the like, rather than the first printed matter, can also be used as the reference value.

Information processing apparatus 10 instructs image forming apparatus 20 to adjust the color information to the set color information.

Based on the color information which follows the instruction from information processing apparatus 10, image forming apparatus 20 performs digital printing.

[Description of Print Data]

Figure 2:
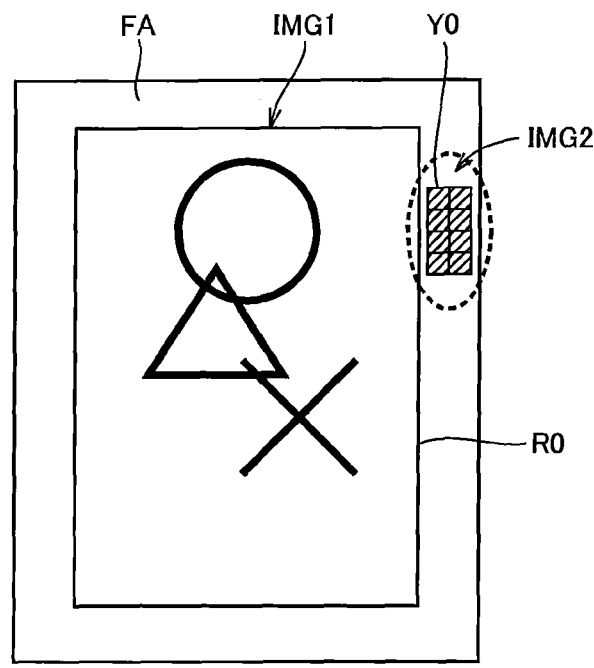
FIG. 2 is a diagram illustrating print data FA based on an embodiment.

FIG. 2 is a diagram illustrating print data FA based on an embodiment.

As shown in FIG. 2, print data FA for offset printing includes an image IMG1 of "○Δx" and a frame line R0, as well as an image IMG2 provided outside the frame line.

In image IMG1, frame line R0 and the image "○Δx" placed in the region enclosed by frame line R0 are shown. Digital printing is performed on the region in frame line R0 as will be described later herein.

Image IMG2 is a color patch (first color patch) Y0 for color adjustment and corresponds to the color of the base for colors in the region where image IMG1 and image IMG3 overlap each other. In this example, color patch Y0 for the color of the base is provided and, in the illustrated case, the color patch includes eight patch sections, by way of example. The number of the patch sections is determined based on the number of combinations of colors in the overlap region and, in the illustrated case, there are eight patterns of color combinations.

Image IMG2 is placed at a position in a margin region of a sheet of paper so that image IMG2 does not overlap image IMG1.

Figure 3:
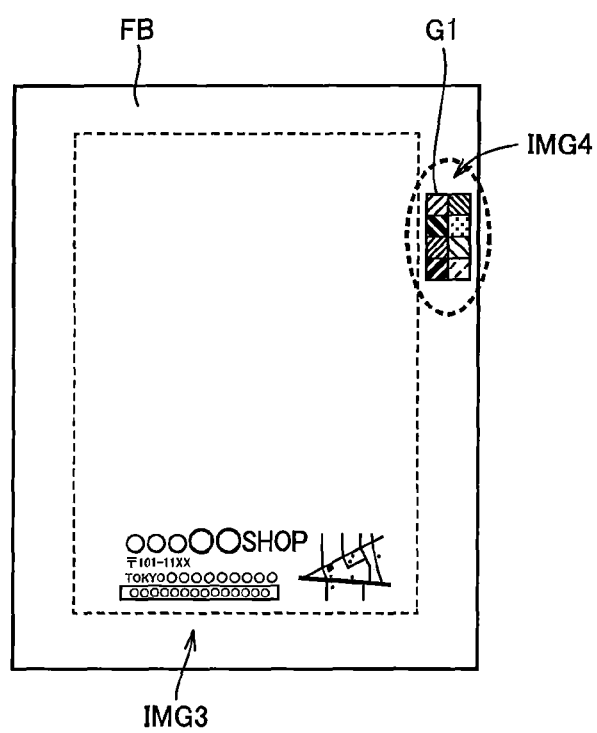
FIG. 3 is a diagram illustrating print data FB based on an embodiment.

FIG. 3 is a diagram illustrating print data FB based on an embodiment.

As shown in FIG. 3, print data FB for digital printing is variable data for printing in the region enclosed by frame line R0. In this example, print data FB for digital printing includes an image IMG3 of "a character string and a map regarding an address" and an image IMG4 provided outside.

Image IMG3 is set so that the image of "a character string and a map regarding an address" is printed in the region enclosed by frame line R0.

Image IMG4 is a color patch (second color patch) G1 for color adjustment, and corresponds to colors printed on the base color of the overlap region where image IMG1 and image IMG3 overlap each other. In this example, color patch G1 is provided and, in the illustrated case, the color patch includes eight patch sections, by way of example. The number of the patch sections is determined based on the number of combinations of colors in the overlap region and, in the illustrated case, there are eight patterns of color combinations.

Image IMG4 is placed at a position in a margin region of a sheet of paper so that image IMG4 does not overlap image IMG3.

[Description of Printed Matter]

Figure 4A:
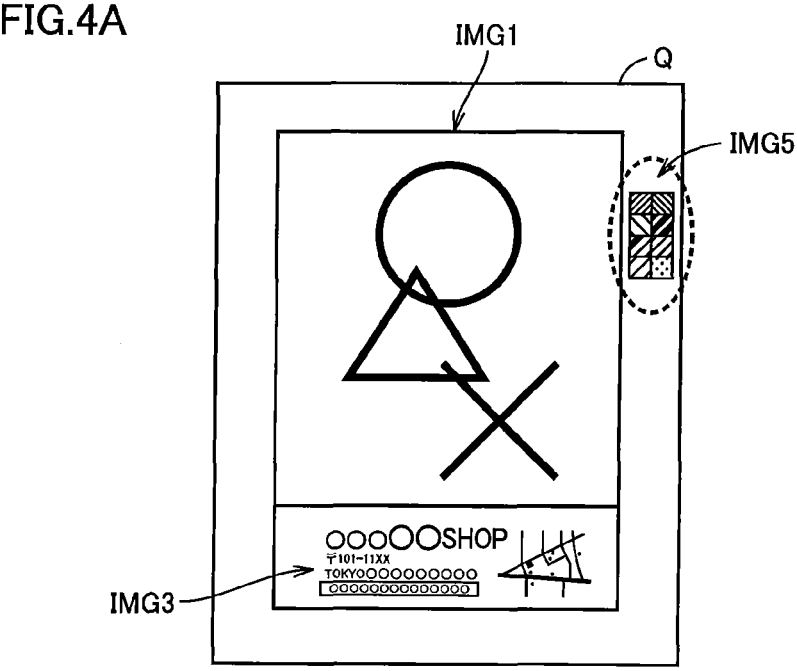
FIGS. 4A and 4B are a diagram illustrating a printed matter Q based on an embodiment.
Figure 4B:
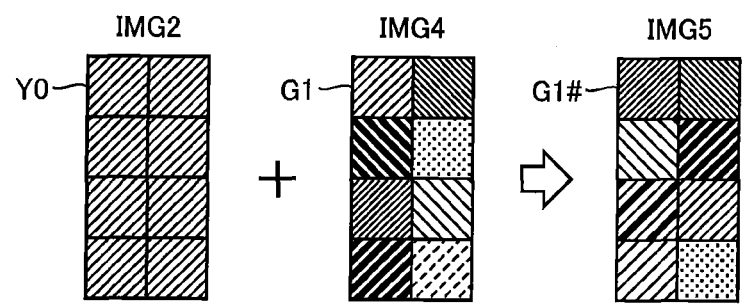

FIGS. 4A and 4B are a diagram illustrating printed matter Q based on an embodiment.

As shown in FIG. 4A, printed matter Q is a final printed matter generated through printing based on print data FB on printed matter P generated through printing by image forming apparatus 40 based on print data FA as described above.

On this printed matter Q, images IMG1, IMG3, and IMG5 have been printed.

Here, image IMG5 is an image generated by overwriting image IMG4 image IMG2. Image IMG5 is a patch pattern based on the color combinations in the overlap region and, in the illustrated case, the number of the combinations is eight.

FIG. 4B is a diagram illustrating image IMG5 generated by overwriting image IMG4 on image IMG2.

As shown in FIG. 4B, a color patch G1# of the colors in the overlap region is generated by printing second color patch G1 on first color patch Y0.

In the embodiment, in order to ensure the quality appropriate to final printed matter Q, the color information of color patch G1# generated through printing by image forming apparatus 20 is measured by inline sensor 208, as described above. Then, image forming apparatus 20 transmits the results of the measurement to information processing apparatus 10. Information processing apparatus 10 analyzes the results of the measurement to thereby adjust the color information and outputs the results of the adjustment to image forming apparatus 20. Thus, in the case where a color difference derived from the results of the measurement by inline sensor 208 is a specified value or more, the adjustment can be made so that the color difference is less than the specified value. Specifically, parameters of the color information for printing by image forming apparatus 20 are adjusted so that the color variation of color patch G1# of image IMG5 measured by inline sensor 208 is suppressed.

[Hardware Configuration]

Figure 5:
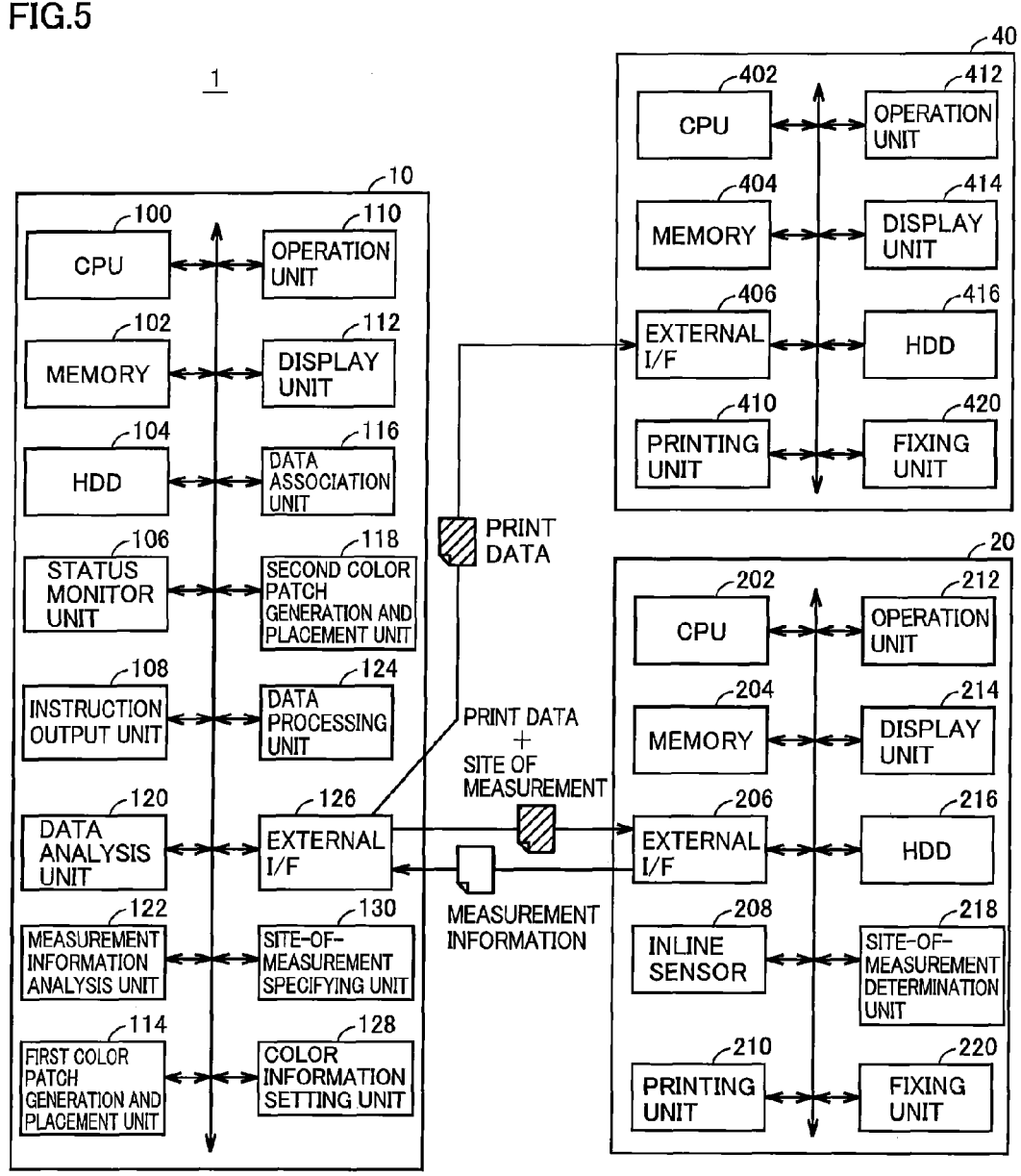
FIG. 5 is a diagram illustrating a hardware configuration of printing system 1 based on an embodiment.

FIG. 5 is a diagram illustrating a hardware configuration of printing system 1 based on an embodiment.

As shown in FIG. 5, printing system 1 includes information processing apparatus 10 and image forming apparatuses 20, 40.

Information processing apparatus 10 includes a CPU (Central Processing Unit) 100, a memory 102, an HDD (Hard Disk Drive) 104, a status monitor unit 106, an instruction output unit 108, an operation unit 110, a display unit 112, a first color patch generation and placement unit 114, a data association unit 116, a second color patch generation and placement unit 118, a data analysis unit 120, a measurement information analysis unit 122, a data processing unit 124, an external I/F 126, a color information setting unit 128, and a site-of-measurement specifying unit 130.

CPU 100 and memory 102 such as a ROM (Read Only Memory) and a RAM (Random Access Memory) for example constitute a control unit.

The ROM stores a control program and data necessary for control. The RAM is used as a working area for data necessary for control by CPU 100 and as a working area when the control operation is done, and stores data and the like that require temporary storage. CPU 100 cooperates with the ROM and the RAM to control the overall operation of information processing apparatus 10.

HDD 104 stores job data and image data, color information and position (coordinates) information derived from the image data, and image data with color patches, and the like.

Status monitor unit 106 monitors the job status or the like, and the states of image forming apparatuses 20, 40.

Operation unit 110 receives user's instructions or operation via a mouth and/or a keyboard, or a touch panel, or the like.

Display unit 112 is formed of an LCD (Liquid Crystal Display) or the like and enables various forms of display regarding printing.

Data processing unit 124 analyzes the job data stored in HDD 104 or job data obtained from a client connected to a communication network, and performs rasterization to thereby generate image data.

Data analysis unit 120 analyzes the image data and extracts each object (Image/Graphic/Text) of the job, color information of each color space (CMYK/RGB/Gray), and position (coordinates) information.

First color patch generation and placement unit 114 generates a color patch corresponding to the color information, and places the generated first color patch at a predetermined location (such as a periphery of an image of the page). The first color patch is included in the print data printed by image forming apparatus 40.

Specifically, data analysis unit 120 analyses the overlap region where the image printed by image forming apparatus 40 and the image printed by image forming apparatus 20 overlap each other and, based on the results of the analysis, generates the color patch corresponding to the color of the base in the overlap region.

Second color patch generation and placement unit 118 generates a color patch corresponding to the color information, and places the generated second color patch at a predetermined location. The second color patch is included in the print data printed by image forming apparatus 20.

Specifically, based on the results of the analysis by data analysis unit 120, the color patch corresponding to colors printed (overprinted) on the base in the overlap region is generated.

The number of patch sections in each of the first and second color patches is the number of color combinations in the overlap region. The second color patch is placed at a position overlapping the first color patch, so that the combinations of the colors in the overlap region is generated.

Site-of-measurement specifying unit 130 specifies a position of measurement of the image data with the color patch that is to be measured by image forming apparatus 20. Specifically, for image forming apparatus 20, site-of-measurement specifying unit 130 specifies the position so that image forming apparatus 20 measures the color information of color patch G1# of image IMG5 where image IMG4 is superimposed on image IMG2.

Data association unit 116 associates the image data with other data or the like. For example, data association unit 116 associates the image of the color patch with information about the position of measurement indicating the site of measurement specified by site-of-measurement specifying, unit 130.

External I/F 126 is constituted of an NIC (Network Interface Card) and/or a modem for example, and transmits to image forming apparatuses 20, 40 print data and the like including the image data with the color patches.

Measurement information analysis unit 122 analyzes the measurement information regarding the measurement made by inline sensor 208 that is received via external I/F 126 from image forming apparatus 20.

Specifically, measurement information analysis unit 122 compares the information about measurement of the color patch measured by image forming apparatus 20 with a reference value, and then determines whether a color difference (color variation) therebetween is larger than a predetermined threshold value. In the case where the color variation is larger than the threshold value, the set information of color information setting unit 128 is rewritten depending on the color variation.

Color information setting unit 128 sets, for each object type and for each color space, the tone curve, the color profile, and the like (parameters).

Instruction output unit 108 instructs image forming apparatus 20 to execute a predetermined command, following an instruction from CPU 100. For example, instruction output unit 108 outputs to image forming apparatus 20 an instruction to change color information to the color information set by color information setting unit 128.

While status monitor unit 106, instruction output unit 108, data association unit 116, first color patch generation and placement unit 114, second color patch generation and placement unit 118, data analysis unit 120, measurement information analysis unit 122, data processing unit 124, color information setting unit 128, and site-of-measurement specifying unit 130 for example are implemented in the form of hardware in this example, these functions may also be implemented by a control program operated by the control unit.

Image forming apparatus 20 includes a CPU 202, a memory 204, an external I/F 206, an inline sensor 208, a printing unit 210, an operation unit 212, a display unit 214, an HDD 216, a site-of-measurement determination unit 218, and a fixing unit 220.

CPU 202 and memory 204 such as a ROM (Read Only Memory) and a RAM (Random Access Memory) for example constitute a control unit.

The ROM stores a control program and data necessary for control. The RAM stores data necessary for control by CPU 202 and data or the like that requires temporary storage when a control operation is done. CPU 202 cooperates with the ROM and the RAM to control the overall operation of image forming apparatus 20.

HDD 216 stores image data with the color patch and the information about the position of measurement indicating the location where the color value is to be measured, for example, that are transmitted from information processing apparatus 10.

Operation unit 212 receives users instructions or operation via a mouth and/or a keyboard, or a touch panel, or the like.

Display unit 214 is formed of an LCD (Liquid Crystal Display) or the like and enables various forms of display regarding printing.

External I/F 206 is constituted of an NIC (Network Interface Card) and/or a modem for example, receives from information processing apparatus 10 image data with the color patch (print data), and also transmits to information processing apparatus 10 information about measurement derived from measurement of a color value by inline sensor 208.

Printing unit 210 follows an electrophotography process to form an image on a sheet of paper, based on the image data with the color patch that is received from information processing apparatus 10. Specifically, printing unit 210 includes: a writing unit applying a laser beam to perform exposure based on the image data a photoconductor unit which includes a photoconductor drum, a developing device, a charging device, a photoconductor cleaning unit, and a primary transfer roller, for forming a toner image of each color of CMYK; an intermediate transfer belt rotated by rollers to function as an intermediate transfer unit transporting the toner image formed by the photoconductor unit to a sheet of paper; a secondary transfer roller transferring the toner image formed on the intermediate transfer belt to the sheet of paper; a fixing device fixing the toner image transferred to the sheet of paper; and a transport unit such as a paper feed roller and a registration roller for transporting a sheet of paper, a loop roller, a reverse roller, a paper discharge roller, and the like.

Inline sensor 208 is made up of three different sensors for RGB for example that are provided on a sheet transport path between the fixing device and a paper discharge tray, measures color values based on output values (RGB values) from the three different sensors for each part of a color image, and outputs information about the measurement.

Site-of-measurement determination unit 218 determines the site where the color value is to be measured, based on the information about the position of measurement that is transmitted from information processing apparatus 10, and instructs inline sensor 208 to measure the color values.

While site-of-measurement determination unit 218 and the like are configured in the form of hardware in this example, the functions may also be implemented by a control program operated by the control unit.

Image forming apparatus 40 includes a CPU 402, a memory 404, an external I/F 406, a printing unit 410, an operation unit 412, a display unit 414, an HDD 416, and a fixing unit 420.

While Image forming apparatus 40 differs from image forming apparatus 20 in that the former is not mounted with the inline sensor and the site-of-measurement determination unit, other functions of image forming apparatus 40 are basically identical to those implemented by the hardware of image forming apparatus 20. The detailed description of the functions of image forming apparatus 40 will therefore not be given.

[Patch Generation Process Flow of Image Processing Apparatus]

Figure 6:
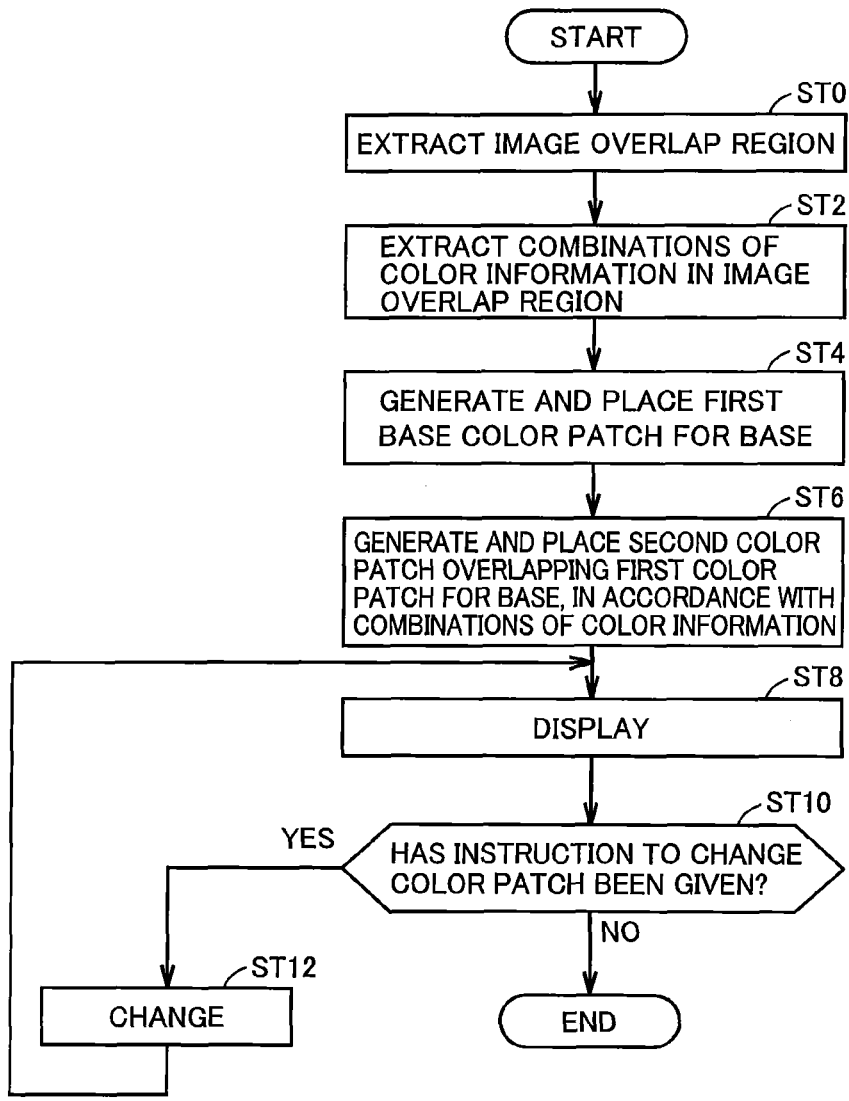
FIG. 6 is a flow diagram illustrating a color-patch generation process of an information processing apparatus 10 based on an embodiment.

FIG. 6 is a flow diagram illustrating a color-patch generation process of information processing apparatus 10 based on an embodiment.

As shown in FIG. 6, a region where images overlap each other is extracted (step ST0). Specifically, data analysis unit 120 extracts a region where an image printed by image forming apparatus 40 and an image printed by image forming apparatus 20 overlap each other.

Next, combinations of color information in the overlap region where the images overlap each other (superimposed portion) are extracted (step ST2). Data analysis unit 120 analyzes the extracted overlap region to thereby extract the combinations of the color information.

Next, the first color patch for the base is generated and placed (step ST4).

Specifically, first color patch generation and placement unit 114 generates and places first color patch Y0 of image IMG2 corresponding to the color of the base in the overlap region analyzed by data analysis unit 120.

Next, in accordance with the combinations of the color information, the second color patch different from the first color patch for the base is generated and placed (step ST6).

Specifically, second color patch generation and placement unit 118 generates and places second color patch G1 of image IMG4 corresponding to colors to be printed (overprinted) on the base in the overlap region analyzed by data analysis unit 120.

Then, the color patches are displayed (step ST8). Specifically, display unit 112 displays the first and second color patches together with the image printed by image forming apparatus 40 and the image primed by image forming apparatus 20.

Next, it is determined whether or not an instruction to change the color patch has been given (step ST10). By means of an edit screen provided for editing the color patch as described later herein, the instruction to change can be given. The determination is made as to whether or not this instruction to change has been given.

In the case where it is determined in step ST10 that the instruction to change the color patch has been given (YES in step ST10), the change is made (step ST12). Specifically, the change is made by first color patch generation and placement unit 114 and/or second color patch generation and placement unit 118.

Then, returning to step ST8, the details of the change thus made are displayed.

In the case where it is determined in step ST10 that the instruction to change the color patch has not been given (NO in step ST10), the process is ended (END).

[Edit of Color Patch]

Figure 7:
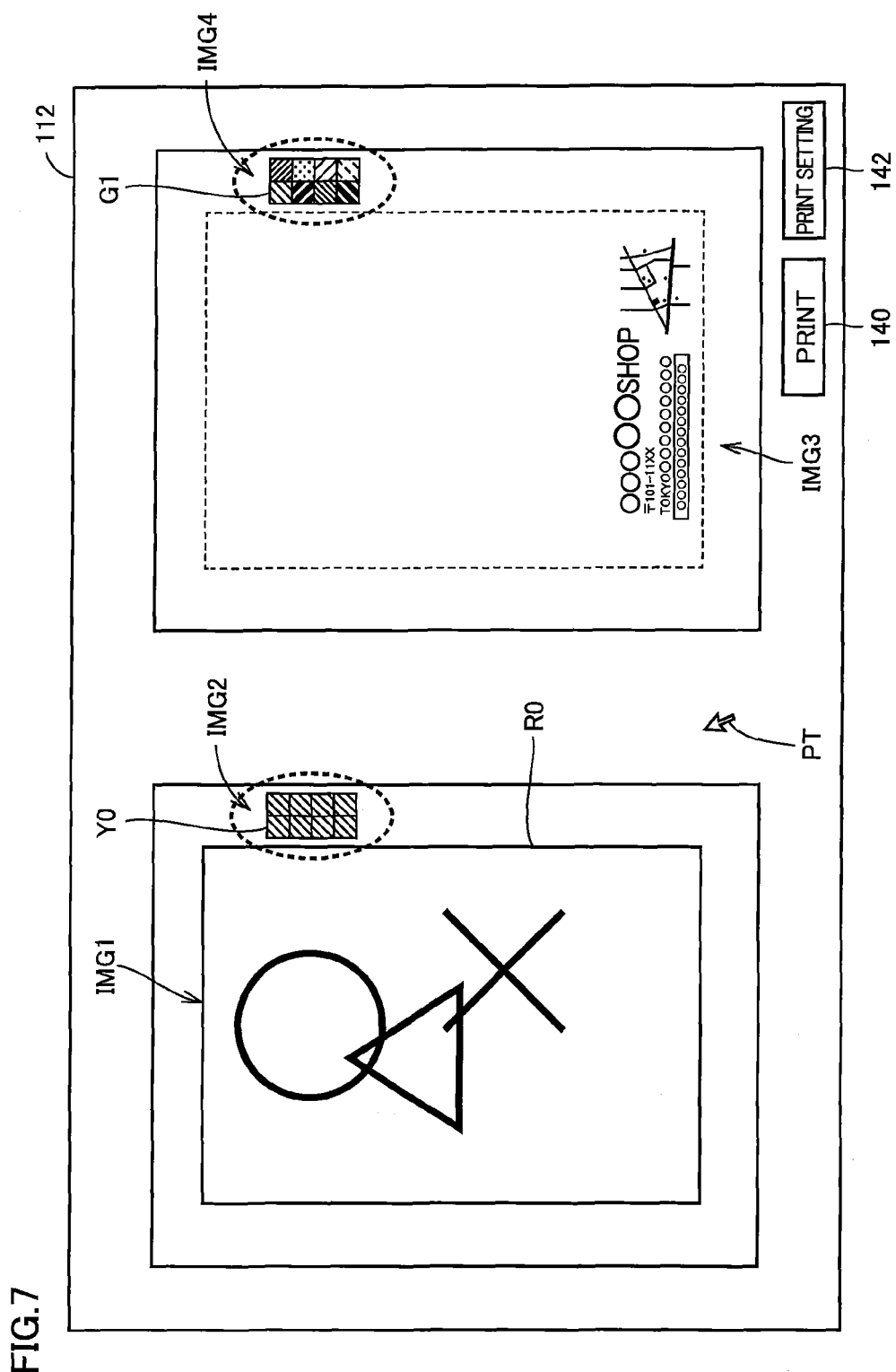
FIG. 7 is a diagram illustrating a screen for editing a color patch based on an embodiment.

FIG. 7 is a diagram illustrating a screen for editing a color patch based on an embodiment.

As shown in FIG. 7, on display unit 112 of information processing apparatus 10, an edit screen based on print data FA and print data FB is indicated.

It is supposed that a variety of settings and changes can be made by means of this edit screen. On this edit screen, respective objects of print data FA and print data FB generated by data processing unit 124 are displayed. On the left side, image data based on print data FA is displayed. On the right side, image data based on print data FB is displayed.

Display unit 112 is provided with a "print" button 140. Selection of this "print" button 140 causes information processing apparatus 10 to transmit print data including the color patches to image forming apparatuses 20, 40.

Display unit 112 is also provided with a "print setting" button 142. Selection of this "print setting" button 142 causes information processing apparatus 10 to display a print setting screen so that printing details can be set.

As described above, data analysis unit 120 analyzes the region where the image printed by image forming apparatus 40 and the image printed by image forming, apparatus 20 overlap each other, and then extracts color information about the overlap region.

First color patch generation and placement unit 114 generates and places first color patch Y0 of image IMG2 corresponding to the color of the base in the overlap region analyzed by data analysis unit 120.

Second color patch generation and placement unit 118 generates and places second color patch G1 of image IMG4 corresponding to the colors printed (overprinted) on the base in the overlap region analyzed by data analysis unit 120.

The number of patch sections in each of the first and second color patches is the number of combinations of colors in the overlap region. The second color patch is placed at a position overlapping the first color patch so that the combinations of the colors in the overlap region are generated.

The above-described process enables inline sensor 208 of image forming apparatus 20 to properly measure the color patch, and thereby enables proper color management to be performed based on the results of the measurement. Accordingly, the quality appropriate to the final printed matter can be ensured.

While the present example has been described regarding the case where the number of patch sections in each of images IMG2 and IMG4 is eight, the number is not limited to this and any number of color combinations in the overlap region can be provided. If the number of colors in the overlap region is large, a limited number of color patch sections may be provided.

For example, the maximum number of patch sections corresponding to the colors printed on the base color may be set to eight.

If it is necessary to arrange colors of more than the maximum number of the patch sections, the colors of the color patch may be edited. In this regard, a pointer PT or the like may be used to specify and change a color from among the color combinations in the overlap region.

[Process Flow of Image Forming Apparatus 20]

Figure 8:
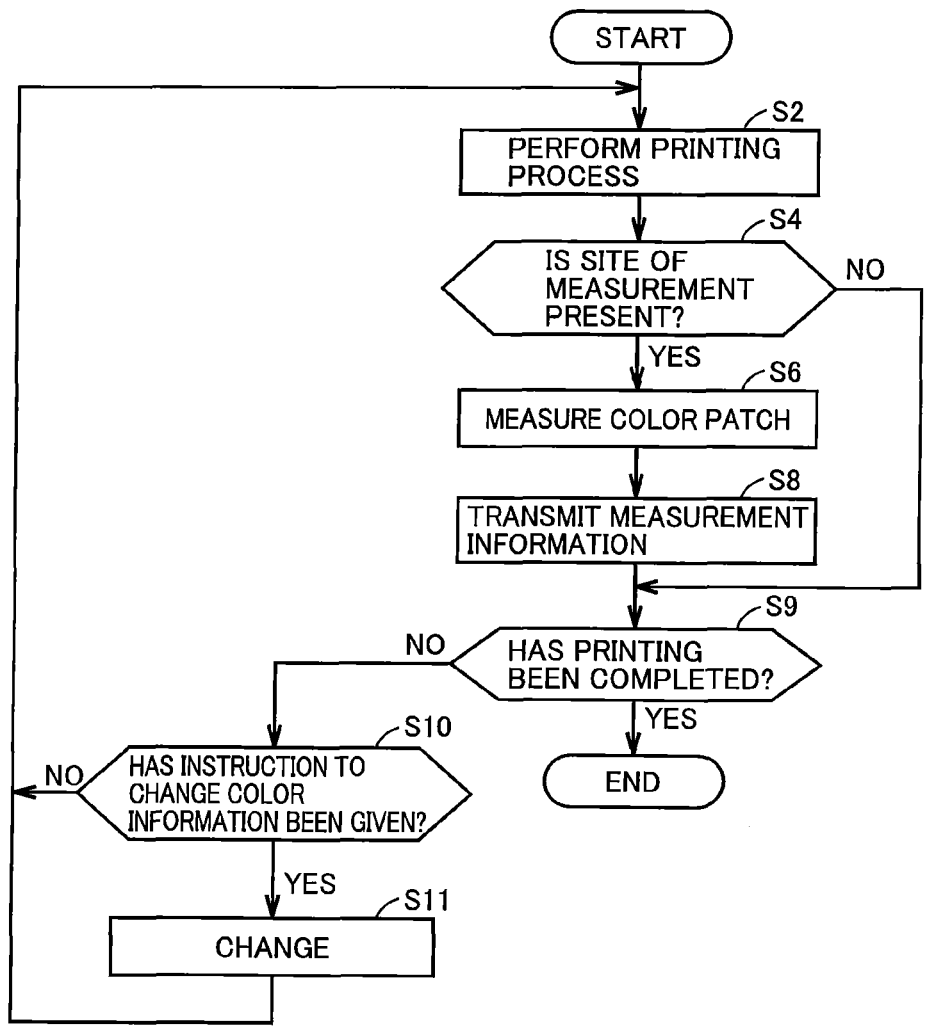
FIG. 8 is a flow diagram illustrating a color-patch measurement process of an image forming apparatus 20 based on an embodiment.

FIG. 8 is a flow diagram illustrating a color-patch measurement process of image forming apparatus 20 based on an embodiment.

As shown in FIG. 8, image forming apparatus 20 performs a printing process (step S2). Specifically, image forming apparatus 20 receives, via external I/F 206, print data and information about a site of measurement, and printing unit 210 prints, based on the received print data FB, an image on printed matter P generated through printing by image forming apparatus 40.

Next, image forming apparatus 20 determines whether or not a site of measurement is present (step S4). Specifically, site-of-measurement determination unit 218 determines whether or not information about a site of measurement (information about a position of measurement) is present.

Next, in the case where image forming apparatus 20 determines that a site of measurement is present (YES in step S4), it measures a color patch (step S6). Specifically, in the case where site-of-measurement determination unit 218 determines that information about a position of measurement is present, it instructs inline sensor 208 to measure the specified site. In this example, inline sensor 208 measures color values of the color patch of image IMG5 of printed matter Q.

Next, image forming apparatus 20 transmits the information measured by inline sensor 208 to information processing apparatus 10 (step S8). Specifically, CPU 202 outputs the information about the measurement made by inline sensor 208 to information processing apparatus 10 via external I/F 206.

Next, image forming apparatus 20 determines whether or not printing has been completed (step S9). Specifically, CPU 202 determines whether or not the print job has been completed (printing on a specified number of sheets of paper has been completed).

In the case where image forming apparatus 20 determines in step S9 that printing has been completed (YES in step S9), it ends the process. Specifically, in the case where image forming apparatus 20 determines that the print job has been completed (printing on a specified number of sheets of paper has been completed), it ends the process.

In contrast, in the case where image forming apparatus 20 determines in step S9 that printing has not been completed (NO in step S9), it determines whether or not an instruction to change color information has been given (step S10). Specifically, in the case where CPU 202 determines that the print job has not been completed (printing on a specified number of sheets of paper has not been completed), it determines whether or not an instruction to change color information has been received via external I/F 206.

In the case where image forming apparatus 20 determines in step S10 that an instruction to change color information has been given (YES in step S10), it changes setting (step S11). Specifically, in the case where CPU 202 has received an instruction to change color information which is input via external I/F 206, it instructs printing unit 210 to perform printing following the instruction to change.

Returning to step S2, image forming apparatus 20 performs printing based on the adjusted color information. Specifically, based on print data FB, printing unit 210 prints, on printed matter P generated through printing by image forming apparatus 40, an image in accordance with the adjusted color information.

In contrast, in the case where image forming apparatus 20 determines in step S10 that an instruction to change color information has not been given (NO in step S10), it returns to step S2 and performs a printing process similar to the preceding one Specifically, based on print data FB, printing unit 210 prints, on printed matter P generated through printing by image forming apparatus 40, an image in accordance with color information similar to the preceding one.

In contrast, in the case where image forming apparatus 20 determines in step S4 that a site of measurement is not present (NO in step S4), it skips steps S6 and S8 and proceeds to step S9. The following process is similar to the above-described one.

[Process Flow of Information Processing Apparatus]

Figure 9:
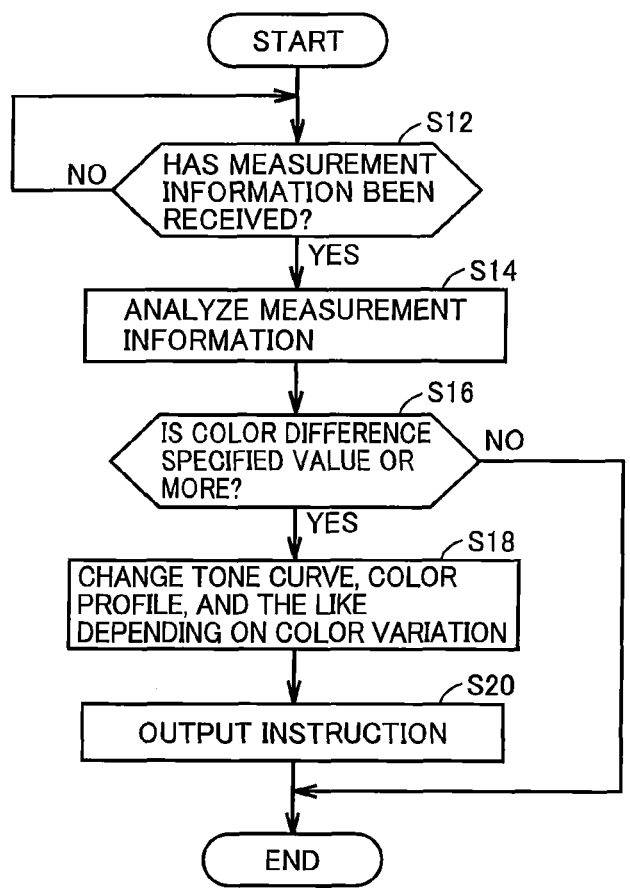
FIG. 9 is a flow diagram illustrating a color information adjustment process of information processing apparatus 10 based on an embodiment.

FIG. 9 is a flow diagram illustrating a color information adjustment process of information processing apparatus 10 based on an embodiment. Here, a description is mainly given of the color information adjustment process for image forming apparatus 20.

As shown in FIG. 9, information processing apparatus 10 determines whether or not it has received information about measurement from the image forming apparatus (step S12). Specifically, measurement information analysis unit 122 determines whether or not it has received information about measurement from image forming apparatus 20 via external I/F 126.

In step S12, in the case where information processing apparatus 10 has not received information about measurement (NO in step S12), it maintains the current condition.

In the case where information processing apparatus 10 determines in step S12 that it has received information about measurement (YES in step S12), it analyzes the information about measurement (step S14). Specifically, measurement information analysis unit 122 compares information about measurement of color patch G1# printed and generated by image forming apparatus 20 with information about measurement provided as a reference, to thereby obtain a difference in color value (color difference). For example, a reference value to be compared may be a reference value designed in advance. Alternatively, information about measurement of first printed matter Q may be used as the reference value. Information about measurement of the color patch printed on the first printed matter Q may be used as the reference value, and this reference value may be compared with the results of measurement of the color patch on a printed matter which is made after multiple pieces of printed matter have been made, so that a difference in color value (color difference) therebetween is obtained. Information about measurement of printed matter Q tested by way of test printing or the like, rather than the first printed matter, can also be used as the reference value.

Then, information processing apparatus 10 determines whether or not the color difference is a specified value or more (step S16). Specifically, measurement information analysis unit 122 determines whether or not the color difference is a predetermined specified value or more. The specified value may be set as appropriate.

In the case where information processing apparatus 10 determines in step S16 that the color difference is the specified value or more (YES in step S16), it changes the tone curve, the color profile, and the like (parameters) depending on the color variation (step S18). Specifically, in the case where measurement information analysis unit 122 determines that the color difference is the specified value or more, it instructs color information setting unit 128 to change, depending on the color variation, the tone curve, the color profile, and the like (parameters) for image forming apparatus 20 which have been set by color information setting unit 128. The tone curve, the color profile, and the like (parameters) are changed so that the color difference is less than the specified value. It should be noted that measurement information analysis unit 122 corresponds to "adjustment unit" of the present invention.

Then, information processing apparatus 10 outputs an instruction (step S20). Specifically, instruction output unit 108 outputs the changed color information to image forming apparatus 20. Image forming apparatus 20 performs a printing process based on the adjusted color information.

Then, information processing apparatus 10 ends the process (END).

In contrast, in the case where information processing apparatus 10 determines in step S16 that the color difference is not the specified value or more (NO in step S16), it directly ends the process (END). Specifically, measurement information analysis unit 122 ends the process without giving an instruction to change to color information setting unit 128.

The adjustment of the color information based on the information about measurement given from image forming apparatus 20 makes it possible to suppress and keep at a certain value the color variation of the overlap region where a printed portion of a printed matter generated through offset printing and a printed portion generated through digital printing overlap each other, and accordingly ensure the quality appropriate to the final printed matter. While the foregoing description of the present example is about the system of properly managing colors for a printed matter generated through offset printing, the system is not limited particularly to offset printing and is applicable as well to other types of printed matters.

<Modification>

Figure 10:
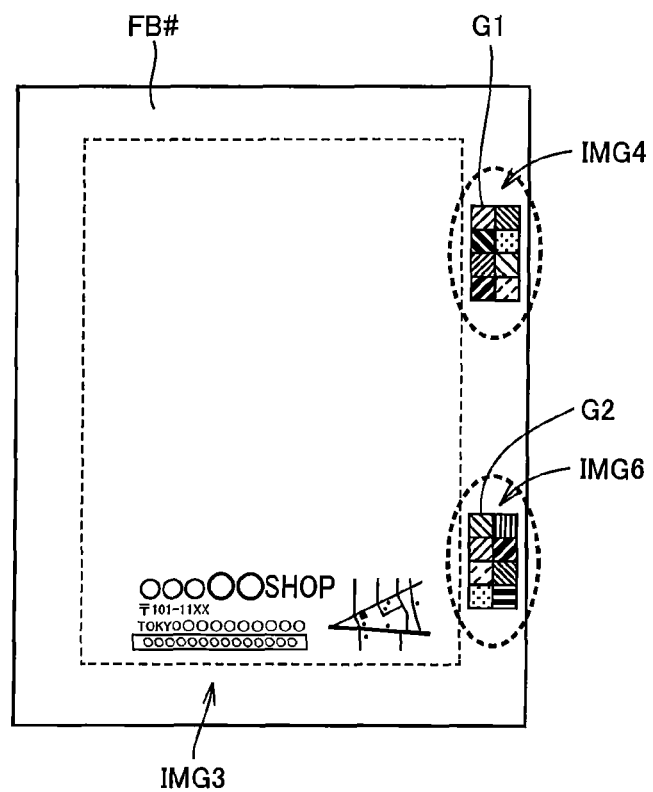
FIG. 10 is a diagram illustrating print data FB# based on a modification of the embodiment.

FIG. 10 is a diagram illustrating print data FB# based on a modification of the embodiment.

As shown in FIG. 10, print data FB# for digital printing differs from print data FB in that the former additionally includes an image IMG6 provided outside. Other features are similar to the above describe ones, and therefore, the detailed description thereof will not be repeated.

Image IMG6 is a color patch (third color patch) for color adjustment, and corresponds to colors of image IMG3 in the region where image IMG1 and image IMG3 do not overlap each other. In this example, a color patch G2 is provided and, in the illustrated example, the color patch includes eight patch sections, by way of example. The number of the patch sections is determined based on the number of colors in the region where the images do not overlap each other and, in the illustrated case, there are eight patterns of the colors.

Image IMG6 is placed at a position in a margin region of a sheet of paper so that image IMG6 does not overlap image IMG3.

Figure 11:
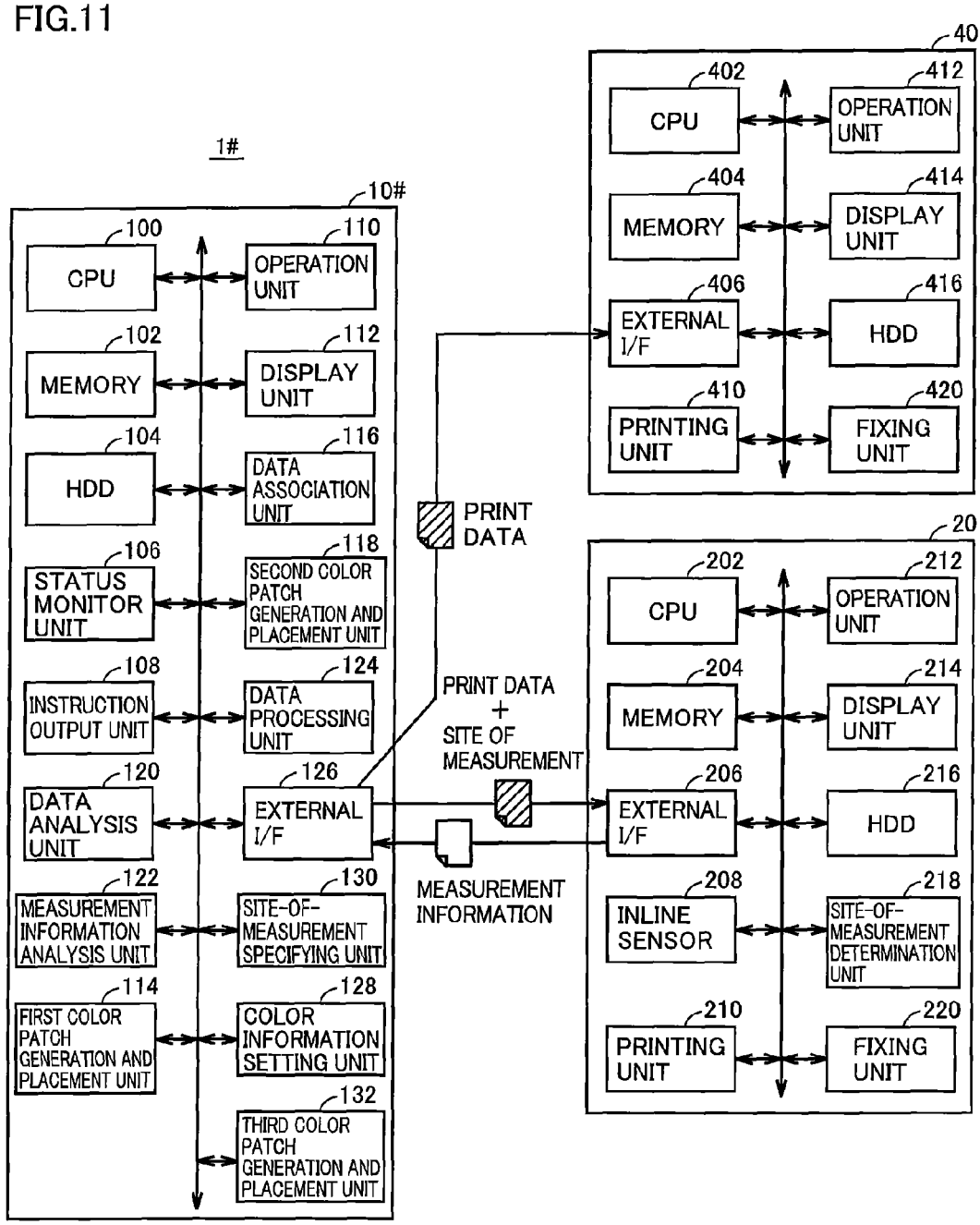
FIG. 11 is a diagram illustrating a hardware configuration of a printing system 1# based on a modification of the embodiment.

FIG. 11 is a diagram illustrating a hardware configuration of a printing system 1# based on a modification of the embodiment.

As shown in FIG. 11, printing system 1# differs from printing system 1 in that the former includes an information processing apparatus 10# instead of information processing apparatus 10. The remaining components are similar to those described above.

Information processing apparatus 10# differs from information processing apparatus 10 in that the former additionally includes a third color patch generation and placement unit 132.

Third color patch generation and placement unit 132 generates a color patch corresponding to color information, and places the generated third color patch at a predetermined location (such as a periphery of an image of the page). The third color patch is included in the print data printed by image forming apparatus 20.

Specifically, data analysis unit 120 analyzes a region of the image printed by image forming apparatus 20 where the image printed by image forming apparatus 40 and the image printed by image forming apparatus 20 do not overlap each other; and generates and places the color patch corresponding to colors in the region where they do not overlap each other, based on the results of the analysis.

The remaining components are similar to the above-described ones, and therefore, the detailed description thereof will not be repeated.

[Print Setting Screen]

Figure 12:
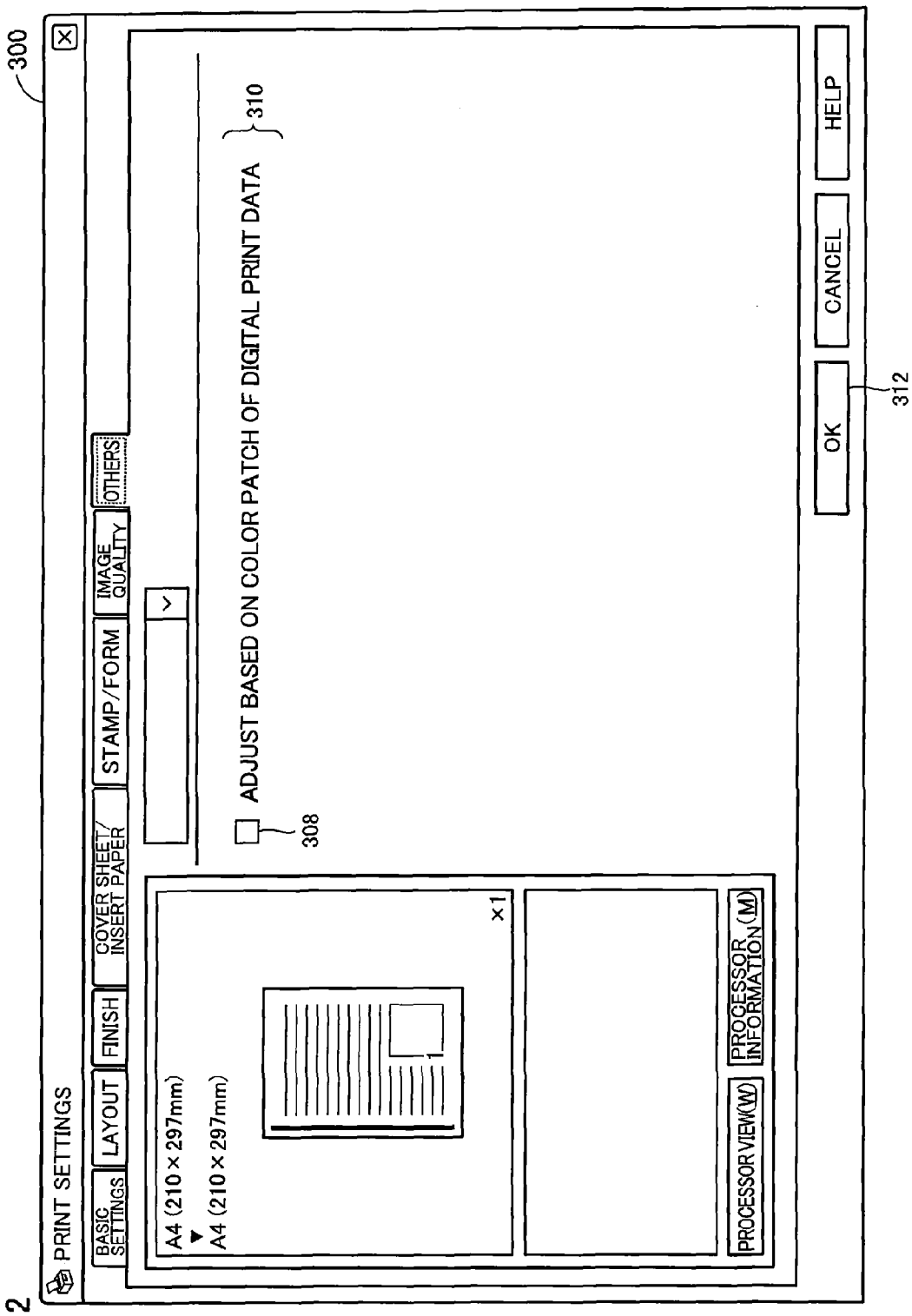
FIG. 12 is a diagram illustrating a print setting screen based on an embodiment.

FIG. 12 is a diagram illustrating a print setting screen based on an embodiment.

As shown in FIG. 12, display unit 112 of information processing apparatus 10 indicates a print setting screen 300, by way of example. Specifically, selection of "print setting" button 142 on the aforementioned edit screen causes a print setting screen to be displayed with which the print setting can be done.

On this print setting screen, a plurality of tabs are provided. In this example, selection of the "others" tab enables execution of a predetermined function to be selected.

Specifically, an item of a function (adjustment change setting unit) of making adjustments based on the color patch of the digital print data is provided, and the function is provided so that it can be selected.

For the item of this function, a checkbox is provided, and a check mark placed in the checkbox sets the function effective.

In this example, the item of the function of making adjustments based on the color patch of the digital print data is provided so that this function can be selected.

Checkbox 308 is provided that corresponds to the item of the function of making adjustments based on the color patch of the digital print data.

A check mark placed in checkbox 308 sets the function effective of making adjustments based on the color patch of the digital print data.

In accordance with this setting, what is to be measured is changed. Specifically, only the color patch (third color patch) for color adjustment that is printed by image forming apparatus 20 is to be measured.

In the case where measurement information analysis unit 122 receives information about measurement from image forming apparatus 20, measurement information analysis unit 122 compares the information about measurement of the color patch (third color patch) for color adjustment that is printed by image forming apparatus 20, with reference information to be compared therewith.

For example, as the reference value to be compared, a reference value designed in advance may be used. Alternatively, information about measurement of first printed matter Q may be used as the reference value. Information about measurement of the color patch printed on the first printed matter Q may be used as the reference value, and this reference value may be compared with the results of measurement of the color patch on a printed matter which is made after multiple pieces of printed matter have been made, so that a difference in color value (color difference) therebetween is obtained. Information about measurement of printed matter Q tested by way of test printing or the like, rather than the first printed matter, can also be used as the reference value.

Then, in the case where measurement information analysis unit 122 determines that the color difference is a specified value or more, it instructs color information setting unit 128 to change, depending on the color variation, the tone curve, the color profile, and the like (parameters) for image forming apparatus 20 which have been set by color information setting unit 128. The tone curve, the color profile, and the like (parameters) are changed so that the color difference is less than the specified value. Then, instruction output unit 108 outputs the changed color information to image forming apparatus 20. Based on print data FB, image forming apparatus 20 prints an image in accordance with the adjusted color information.

Accordingly, based on the color patch (third color patch) for color adjustment that is printed by image forming apparatus 20, the color variation of the printed portion generated through digital printing can be suppressed and the colors can properly be managed to thereby ensure the quality appropriate to the final printed matter.

In the case where the superimposed portion is specified as what is to be measured and suppression of the color variation is difficult in such a case, a color patch of colors other than the superimposed portion (non-overlap region) may be generated in accordance with an instruction, to thereby enable, based on the color patch, suppression of the color variation in the printed portion generated through digital printing and thus enable proper color management.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing apparatus controlling a first image forming apparatus, and a second image forming apparatus performing printing on a printed matter printed by said first image forming apparatus and including a measurement unit measuring a printed given region, said information processing apparatus comprising:
a first color patch generation unit generating a first color patch which is included in first print data printed by said first image forming apparatus; and
a second color patch generation unit generating a second color patch which is included in second print data printed by said second image forming apparatus, the second color patch being printed on said first color patch printed by said first image forming apparatus;
said measurement unit measuring a region in which said first color patch printed by said first image forming apparatus overlaps with said second color patch printed by said second image forming apparatus,
said information processing apparatus further comprising:
an adjustment unit adjusting color information in printing on said printed matter by said second image forming apparatus, based on a result of measurement by said measurement unit; and
an instruction output unit instructing said second image forming apparatus to print based on the color information adjusted by said adjustment unit.

2. The information processing apparatus according to claim 1, wherein said adjustment unit makes a determination as to whether or not a color difference between said result of measurement by said measurement unit and reference information is less than a specified value.

3. The information processing apparatus according to claim 2, wherein said adjustment unit adjusts a parameter of said color information based on a result of the determination.

4. The information processing apparatus according to claim 1, wherein said second color patch generation unit edits said second color patch included in said second print data, in accordance with an instruction.

5. The information processing apparatus according to claim 1, further comprising a third color patch generation unit generating a third color patch which is included in the second print data printed by said second image forming apparatus and printed on a region other than a region where said first color patch overlaps with said second color patch, wherein said adjustment unit adjusts the color information in printing on said printed matter by said second image forming apparatus, based on a result of measurement of the third color patch measured by said measurement unit, in accordance with an instruction.

6. A control method for an information processing apparatus controlling a first image forming apparatus, and a second image forming apparatus performing printing on a printed matter printed by said first image forming apparatus and including a measurement unit measuring a printed given region, said control method comprising the steps of:
generating a first color patch which is included in first print data printed by said first image forming apparatus;
generating a second color patch which is included in second print data printed by said second image forming apparatus, the second color patch being printed on said first color patch printed by said first image forming apparatus;
measuring, by said measurement unit, a region in which said first color patch printed by said first image forming apparatus overlaps with said second color patch printed by said second image forming apparatus,
adjusting color information in printing on said printed matter by said second image forming apparatus, based on a result of measurement by said measurement unit; and
instructing said second image forming apparatus to print based on the adjusted color information.

7. The control method for an information processing apparatus according to claim 6, wherein said step of adjusting makes a determination as to whether or not a color difference between said result of measurement by said measurement unit and reference information is less than a specified value.

8. The control method for an information processing apparatus according to claim 7, wherein said step of adjusting adjusts a parameter of said color information based on a result of the determination.

9. The control method for an information processing apparatus according to claim 6, wherein said step of generating a second color patch edits said second color patch included in said second print data, in accordance with an instruction.

10. The control method for an information processing apparatus according to claim 6, further comprising the step of generating a third color patch which is included in the second print data printed by said second image forming apparatus and printed on a region other than a region where said first color patch overlaps with said second color patch, wherein said step of adjusting adjusts the color information in printing on said printed matter by said second image forming apparatus, based on a result of measurement of the third color patch measured in accordance with an instruction.

11. An image forming system comprising:
a first image forming apparatus;
a second image forming apparatus performing printing on a printed matter printed by said first image forming apparatus and including a measurement unit measuring a printed color patch; and
an information processing apparatus controlling said first and second image forming apparatuses, said information processing apparatus comprising:
- a first color patch generation unit generating a first color patch which is included in first print data printed by said first image forming apparatus; and
- a second color patch generation unit generating a second color patch which is included in second print data printed by said second image forming apparatus, the second color patch being printed on said first color patch printed by said first image forming apparatus;

said measurement unit measuring a region in which said first color patch printed by said first image forming apparatus overlaps with said second color patch printed by said second image forming apparatus, said information processing apparatus further comprising:
- an adjustment unit adjusting color information in printing on said printed matter by said second image forming apparatus, based on a result of measurement by said measurement unit; and
- an instruction output unit instructing said second image forming apparatus to print based on the color information adjusted by said adjustment unit.

12. The image forming system according to claim 11, wherein said adjustment unit makes a determination as to whether or not a color difference between said result of measurement by said measurement unit and reference information is less than a specified value.

13. The image forming system according to claim 12, wherein said adjustment unit adjusts a parameter of said color information based on a result of the determination.

14. The image forming system according to claim 11, wherein said second color patch generation unit edits said second color patch included in said second print data, in accordance with an instruction.

15. The image forming system according to claim 11, said information processing apparatus further comprising a third color patch generation unit generating a third color patch which is included in the second print data printed by said second image forming apparatus and printed on a region other than a region where said first color patch overlaps with said second color patch, wherein
- said adjustment unit adjusts the color information in printing on said printed matter by said second image forming apparatus, based on a result of measurement of the third color patch measured by said measurement unit, in accordance with an instruction.

* * * * *